United States Patent [19]

Duburcq et al.

[11] Patent Number: 5,870,571
[45] Date of Patent: *Feb. 9, 1999

[54] AUTOMATIC CONTROL OF DATA TRANSFER RATES OVER A COMPUTER BUS

[75] Inventors: Bernard Duburcq, Echirolles; Virginie Joly, Grenoble, both of France

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 691,777

[22] Filed: Aug. 2, 1996

[51] Int. Cl.⁶ .................................................. G06F 13/40
[52] U.S. Cl. .......................... 395/309; 395/306; 395/308
[58] Field of Search .................................. 395/309, 308, 395/306, 250, 280, 281

[56] References Cited

U.S. PATENT DOCUMENTS 5,313,595  5/1994  Lewis et al. .
5,550,990  8/1996  Keener et al. .

FOREIGN PATENT DOCUMENTS

WO 94/08305  4/1994  WIPO .
WO 95/02281  1/1995  WIPO .

*Primary Examiner*—Meng-Al T. An
*Assistant Examiner*—Rupal D. Dharia

[57] ABSTRACT

In a computer with an UltraSCSI bus system, an arrangement is provided for reducing the possibility of the SCSI specifications being exceeded. This arrangement involves selectively inhibiting the host adaptor from using the UltraSCSI data rate when any external SCSI device is detected as present. When there are no such external devices, it is assumed that the computer has been internally designed such that the UltraSCSI specifications will not normally be exceeded so that the UltraSCSI data rate can be safely enabled.

7 Claims, 2 Drawing Sheets

AUTOMATIC CONTROL OF DATA TRANSFER RATES OVER A COMPUTER BUS

FIELD OF THE INVENTION

The present invention relates to the automatic control of data transfer rates over a computer bus and, in particular, but not exclusively to the control of data transfer rates over a "SCSI" bus.

BACKGROUND OF THE INVENTION

SCSI (Small Computer Systems Interface) is a well known ANSI standard defining the physical and electrical parameters of an I/O bus for effecting parallel data transfers in small computer systems, for example, between a host processor system and one or more peripheral devices such as hard disk drives or CD-ROM drives.

Generally, a host processor system will interface via a SCSI host adaptor with a SCSI bus to which one or more SCSI devices are connected. These devices may be internal to the computer of which the host processor system forms a part, or external to the computer.

In fact, there are a number of SCSI standards, the original standard (here referred to as SCSI-1) and its successor (SCSI-2) in its basic form, both relating to 8-bit wide data transfers at 5 Megabytes/second. An option of SCSI-2 known as Fast SCSI provides for a data transfer rate of 10 Megabytes/second whilst another SCSI-2 option provides for bus widths of 16 or 32 bits to double or quadruple the data rates available with the basic SCSI-2 standard or the Fast SCSI option. More recently, an "UltraSCSI" option has been developed providing for transfer rates of 20 Megabytes/second in the case of an 8-bit wide bus. The above-quoted data rates refer to the synchronous transmission mode. It should be noted that although a SCSI bus system may have been designed to support Fast SCSI or UltraSCSI data rates, such a rate will only be used if both devices participating in a particular transfer is capable of supporting it—if either device cannot handle the rate, then both devices will use a lower rate (the data rate to be used is subject to an initial negotiation between the devices).

With data transfer rates of the order provided by SCSI systems, in order to achieve reliable transmission care has to be taken to effect proper termination of the bus cable at both ends; in addition, it is necessary to limit the length of bus cable permitted and the number of connected physical devices (host adaptor or peripheral).

As regards termination, problems frequently arise when system configuration is changed (a SCSI device added or removed) simply because bus termination is not correspondingly adjusted. To deal with this problem a number of recent proposals have been made for automatically controlling termination of a SCSI bus by detecting the presence or absence of upstream/downstream SCSI devices. Arrangements for doing this are described in U.S. Pat. No. 5,313,595; WO-A-94/08305; and WO-A-95/02281.

With respect to restrictions on bus length and the number of connected devices, 8-bit single-ended SCSI-2 is restricted to 8 devices and a bus length of 6 meters. UltraSCSI is limited to 8 devices under 1.5 meters or 4 devices between 1.5 meters and 3 meters. The foregoing figures are for single-ended rather than differential transmission.

As there is no inherent way of restricting a user from adding devices and increasing the length of the SCSI bus, it is not uncommon to find systems configured outside of specification with a resultant degradation in transmission quality leading to an increase in data corruption and a reduction of system performance.

It is an object of the present invention to provide some alleviation of the foregoing problem.

SUMMARY OF THE INVENTION

In terms of a computer with an UltraSCSI bus system, the present invention reduces the possibility of the SCSI specifications being exceeded by selectively inhibiting the host adaptor from using the UltraSCSI data rate when any external device is detected as present. When there are no such external devices, it is assumed that the computer has been internally designed such that the UltraSCSI specifications will not normally be exceeded so that the UltraSCSI data rate can be safely enabled (as already noted, whether this rate is used for any particular transfer is the subject of negotiation between competing devices).

More formally and more generally stated, according to the present invention there is provided a computer comprising:

a host processor system;

a peripheral bus system to which peripheral devices can be connected, the peripheral bus system including internal connection means for enabling at least one internal peripheral device to be connected to the peripheral bus system, and an external connector for extending the peripheral bus system for connection to at least one external peripheral device;

a host adaptor for interfacing the host processor system with the peripheral bus system to enable the host processor system to communicate with a said peripheral device connected to the peripheral bus system, the host adaptor being capable of effecting a data transfer across said peripheral bus system with a said peripheral device selectively at one of a first rate and a second, slower, rate;

detection means for detecting the presence of a said external peripheral device connected to said external connector; and control means responsive to the detection means detecting the presence of a said external peripheral device, to inhibit selection of said first data rate for data transfers by said host adaptor over said peripheral bus system.

Preferably, the control means comprises a program run by said host processor system to provide:

means for interrogating said detection means on start up of said computer to determine if an external peripheral device has been detected as present;

means responsive to a said external peripheral device being determined as present to control said host adaptor such that said first data rate is unavailable for selection during subsequent operation of the computer.

Advantageously, the computer further comprises:

first user-controllable means for selectively enabling and disabling said control means; and second, user-controllable means for permitting a user to determine whether said first data rate is available for selection when said control means is disabled by said first user-controllable means.

The first and second user-controllable means are preferably implemented as a setup program run by the host processor system.

According to another aspect of the present invention, there is provided a method of controlling the data transfer rate over a computer bus system between a host processor interface and a peripheral device, said computer bus system comprising an internal leg disposed within a housing of a computer and an external connector for extending the computer bus system outside said housing for connection to at least one external peripheral device, and said host processor interface being capable of effecting a data transfer across said computer bus system with a said peripheral device selectively at one of a first rate and a second, slower, rate; said method comprising the steps of:

(a)—detecting the presence of a said external peripheral device connected to said external connector; and (b)—following detection in step (a) of the presence of a said external peripheral device, inhibiting selection of said first data rate for data transfers by said host adaptor over said computer bus system.

As already indicated, the present invention finds particular application to computers having a SCSI bus system capable of UltraSCSI performance.

BRIEF DESCRIPTION OF THE DRAWINGS

A computer embodying the invention will now be described, by way of non-limiting example, with reference to the accompanying diagrammatic drawings, in which.

BEST MODE OF CARRYING OUT THE INVENTION

Figure 1:
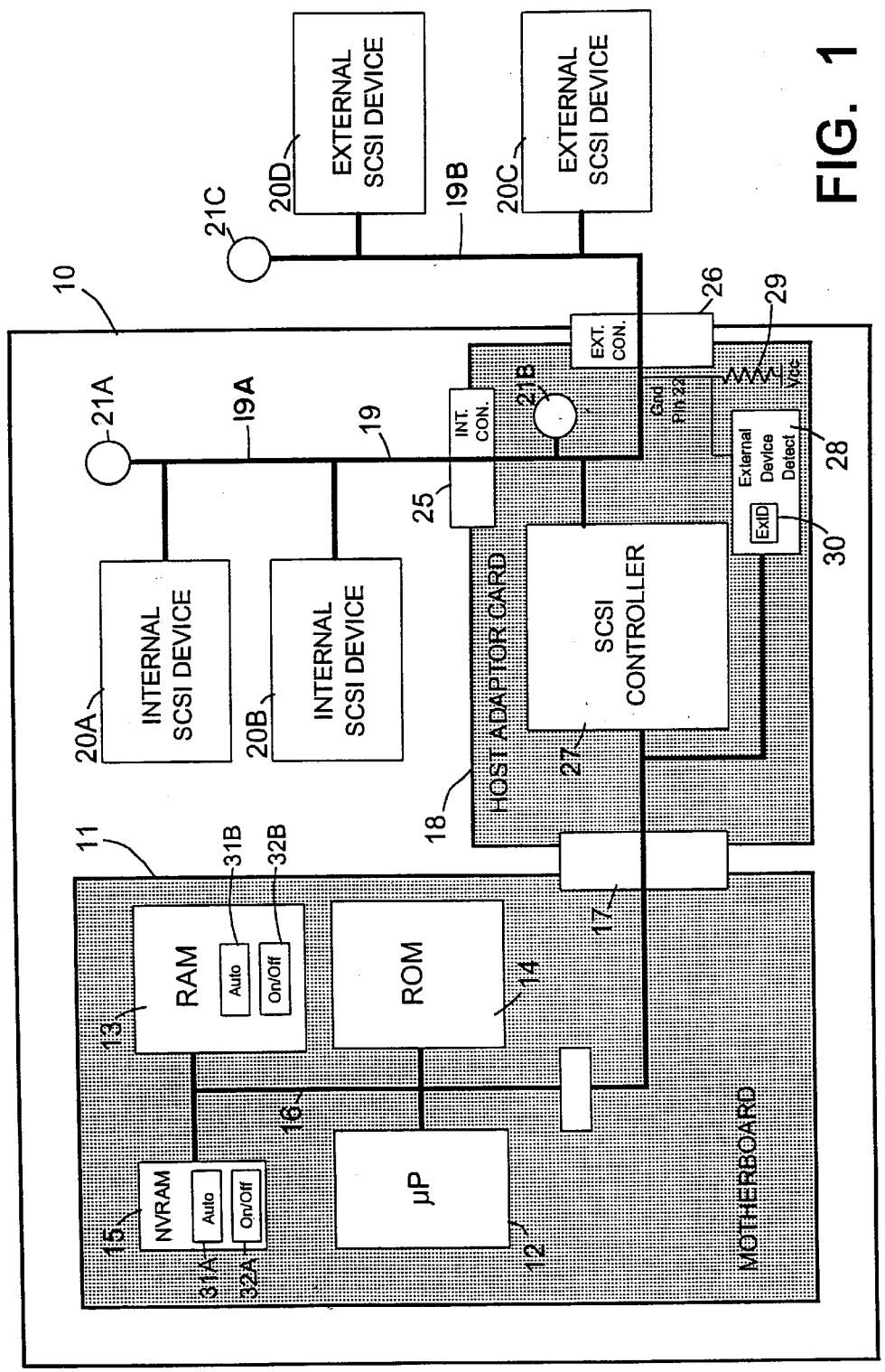
FIG. 1 is a simplified diagram of the computer showing a SCSI bus system for providing host processor access to a number of internal/external peripheral devices.

FIG. 1 shows a computer having a main housing 10 in which are located a motherboard 11 mounting a host microprocessor system, a host adaptor card 18, and internal SCSI devices 20A, 20B; externally of the computer are two external SCSI devices 20C, 20D. The host adaptor card 18 serves to interface the host microprocessor system on the motherboard 11 with the SCSI devices through a SCSI bus 19 that has an internal leg 19A connecting the internal devices 20A, 20B to the host adaptor card 18 through internal connector 25, and an external leg 19B connecting the external devices to the host adaptor card 18 through external connector 26. The number of connected internal and external SCSI devices may be varied from that shown and, in particular, there may be no external devices connected at all (generally, though not necessarily, there will be at least one internal SCSI device).

Considering the host microprocessor system in a little more detail, this comprises a microprocessor 12 that interfaces with a bus 16 to which RAM and ROM memories 12, 14 are also connected. A non-volatile re-writable memory (NVRAM) 15 is also connected to the bus 16 for the purpose of storing configuration and other data during periods when the computer is switched off. The host microprocessor system can communicate over bus 16 with the host adaptor card 18, the latter being plugged into a connector 17 on the motherboard 11. For present purposes, it is not necessary to go beyond this basic description of the host microprocessor system as such systems are well known and understood by persons skilled in the art.

Similarly, the host adaptor card 18 is largely of standard form and comprises a SCSI controller 27 connected both to the bus 16 and to the SCSI bus 19, the internal and external connectors 25, 26, and a selectively-operable active terminator 21B. With regard to termination of the SCSI bus 19, as already mentioned both ends of the bus must be terminated for proper operation of the bus; of course, there must be no intermediate termination of the bus. In the illustrated example, the internal and external legs 19A, 19B of the bus are respectively terminated by terminators 21A, 21C and in this case the terminator 21B is disabled. In the event that either the internal or external legs 19A, 19B are absent (no internal/external devices connected), then it is necessary for the terminator 21B to be enabled. This can be arranged to be done manually (for example, by means of a switch) or automatically in the manner described, for example, in the above-mentioned International Patent Applications.

The SCSI controller serves as an initiator device for initiating data transfers between the host microprocessor system and the peripheral devices 20 A,B,C and D. In initiating any transfer, the SCSI controller carries out a negotiation with the target device 20 to determine the speed at which the transfer is to take place. In the present example, the SCSI controller can effect synchronous transfers at the UltraSCSI rate of 20 Megabytes/second, or at a lower rate of 10 Megabytes/second (the bus 19 is assumed to be 8 bits wide). According to the present invention, the SCSI controller is inhibited from selecting the UltraSCSI rate if there are any external devices 20C, 20D connected, this selective disablement of the UltraSCSI rate being effected even if the target device is an internal one capable of the UltraSCSI rate. The purpose of this selective disablement of the UltraSCSI rate is to reduce the risk of the user exceeding the limitations on bus length and number of connected devices, these limitations being much tighter for the UltraSCSI rate than for lower rates; it is, of course, much more likely that the user will exceed these limitations when connecting external devices than when connecting internal devices since the internal environment of the computer can be designed to make it difficult to breach the limitations. As will be described below, in the present embodiment the automatic selective disablement of the UltraSCSI rate can itself be disabled by the user who can instead elect for the UltraSCSI rate either always to be available or always to be disabled.

To effect automatic selective disabling of UltraSCSI, an arrangement is provided for detecting the presence of a SCSI device connected to the external connector 26. This arrangement comprises a circuit 28 for detecting the state of ground pin 22 of the connector 26, this pin being connected to a pull-up resistor 29 connected to Vcc. When no external devices are connected, the voltage on pin 22 will be high whereas when an external device is connected, the voltage on pin 22 will be zero. The circuit 28 records the state of pin 22 as a binary "0" for no connected device and "1" for a connected device, the appropriate binary value being held in a first control bit ("ExtD" bit 30) stored in an internal register that is readable by the microprocessor system over bus 16.

Two further control bits are also relevant, these being an "Auto" bit 31 and an "On/Off" bit 32. There are two copies of each bit, the first copy being held in NVRAM 15 (copies 31A and 31B) and the second, working copy in RAM 13 (copies 31B and 32B). The state of the "Auto" bit determines whether the automatic selective disabling of UltraSCSI is to be enabled ("1") or disabled ("0"). The state of the "On/Off" bit determines, in the case where automatic selective UltraSCSI disablement is disabled, whether the UltraSCSI rate should be permanently available ("1") or disabled ("0"). The states of the copies 31A and 32A of the "Auto" and "On/Off" bits held in NVRAM are set by the user during a setup process and can only be modified by re-running this process.

Figure 2:
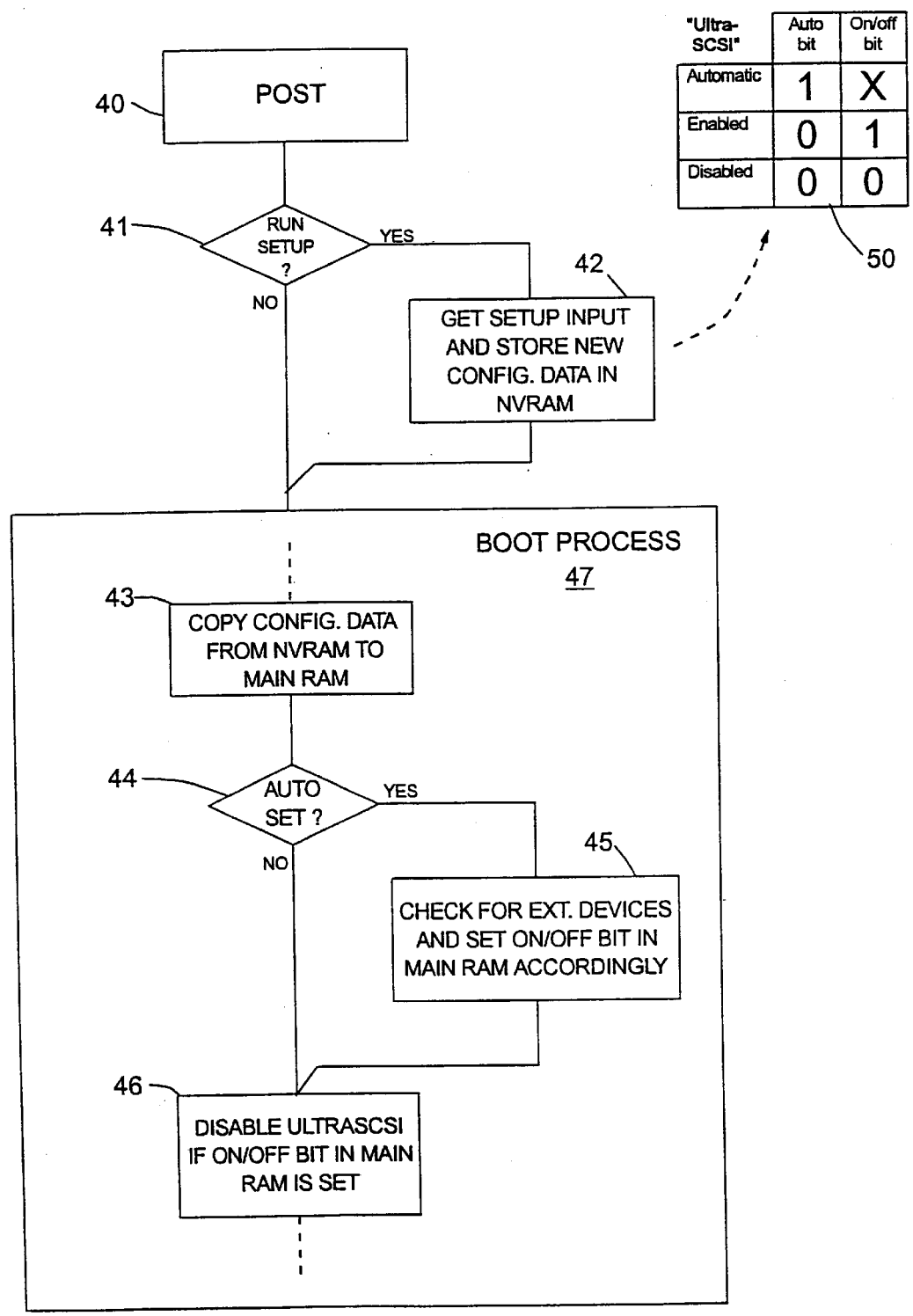
FIG. 2 is a flow chart illustrating the automatic setup of a SCSI host adaptor upon computer start up.

As will next be described with reference to FIG. 2, upon startup of the computer the control bits are read by the microprocessor system and the UltraSCSI rate is accordingly enabled or disabled by means of an appropriate command sent to the SCSI controller. More particularly on startup of the computer a Power On Self Test program is first run (step 40) following which the user is given an opportunity to modify the setup data (step 41). If the user decides to modify the setup data then step 42 is executed. So far as the present invention is concerned, in the current embodiment the user is given the option of choosing one of three modes for UltraSCSI, namely:

the Automatic mode where UltraSCSI is selectively disabled/enabled according to whether or not any external devices are connected;

the Enabled mode where UltraSCSI is always available;

the Disabled mode where UltraSCSI is always disabled, the values of the "Auto" and "On/Off" bits 32A, 32B are set as indicated in Table 50 in FIG. 2 depending on the mode chosen (in this Table "X" indicates a "don't care" value).

Upon completion of the setup step 42, or if the user did not wish to change the setup data, a boot process 47 is run to configure the computer according to the configuration data stored in NVRAM 15 and to load the operating system. Only the portion of the boot process relevant to the present invention is shown in FIG. 2. Thus in step 43 the configuration data, including the "Auto" and "On/Off" bits are copied from NVRAM 15 to RAM 13. Next the state of the "Auto" bit 31B is examined and if this bit is set to "1" to indicate that automatic selective UltraSCSI control is enabled, then step 45 is executed. In step 45 the status of the "ExtD" bit held in circuit 28 is checked; where this latter bit indicates the presence of an external device ("ExtD"="1"), then the copy 32B of the "On/Off" bit held in RAM is set to "0" corresponding to disablement of UltraSCSI, whereas if the "ExtD" bit has a value"0" indicating no external devices, the copy of the "On/Off" bit 32B is set to a value "1" corresponding to enablement of UltraSCSI.

After step 45 is complete, step 46 is executed in which the copy 32B of the "On/Off" bit held in RAM 13 is read and a corresponding command is sent to the SCSI controller 27 to enable or disable UltraSCSI as indicated by the state of the bit 32B.

In the event that the copy 31B of the "Auto" bit tested in step 44 indicates that automatic selective UltraSCSI control is disabled, then step 45 is omitted and step 46 is effected directly; in this case the state of the copy 32B of the "On/off" bit will be as copied across from the NVRAM 15.

It will be appreciated that many variants are possible to the above-described arrangement. In particular, although in the described embodiment the automatic selective enabling/disabling of the UltraSCSI data rate is effected largely by the host microprocessor system under program control, it would also be possible to provide dedicated circuitry operatively interposed between the external-device detection circuit 28 and the SCSI controller 27 to provide the desired automatic control. Such an approach does not, however, lend itself so readily to providing for user interaction to selectively override the automatic rate control.

We claim:

1. A computer comprising:

a host processor system;

a peripheral bus to which peripheral devices can be connected, said peripheral bus including internal connection means for enabling at least one internal peripheral device to be connected to the peripheral bus, and an external connector connected to said peripheral bus for extending the peripheral bus for connection to at least one external peripheral device;

a host adaptor for interfacing the host processor system with the peripheral bus system to enable the host processor system to communicate with an internal or external peripheral device connected to the peripheral bus, the host adaptor being capable of effecting a data transfer across said peripheral bus with said internal or external peripheral device selectively at one of a first rate and a second, slower, rate;

detection means for detecting the presence of an external peripheral device connected to said external connector; and control means responsive to the detection means detecting the presence of a said external peripheral device, to unconditionally inhibit selection of said first data rate for data transfers by said host adaptor over said peripheral bus.

2. A computer according to claim 1, wherein said control means comprises a program run by said host processor system to provide:

means for interrogating said detection means on start up of said computer to determine if an external peripheral device has been detected as present;

means responsive to a said external peripheral device being determined as present to control said host adaptor such that said first data rate is unavailable for selection during subsequent operation of the computer.

3. A computer according to claim 1, further comprising:

first user-controllable means for selectively enabling and disabling said control means; and second user-controllable means for permitting a user to determine whether said first data rate is available for selection when said control means is disabled by said first user-controllable means.

4. A computer according to claim 3, wherein said first and second user-controllable means comprise a setup program run by said host processor system.

5. A computer according to claim 1, wherein said peripheral bus is a SCSI bus.

6. A method of controlling the data transfer rate over a computer bus between a host processor interface and a peripheral device, said computer bus comprising an internal leg disposed within a housing of a computer for enabling at least one internal peripheral device to be connected to the peripheral bus and an external connector for extending the computer bus outside said housing for connection to at least one external peripheral device, and said host processor interface being capable of effecting a data transfer across said computer bus with said internal peripheral device or said external peripheral device selectively at one of a first rate and a second, slower, rate; said method comprising the steps of:

(a)— detecting the presence of an external peripheral device connected to said external connector; and (b)— following detection in step (a) of the presence of said external peripheral device, unconditionally inhibiting selection of said first data rate for data transfers by said host adaptor over said computer bus.

7. A method according to claim 6, wherein said computer bus is a SCSI bus.

* * * * *